United States Patent

Yamamoto et al.

[11] 3,805,829
[45] Apr. 23, 1974

[54] FUEL LEAKAGE PREVENTION DEVICE FOR A MOTOR-VEHICLE

[75] Inventors: Takeshi Yamamoto; Masami Yamamoto, both of Toyota, Japan

[73] Assignee: Toyota Jidosha Kabushiki Kaisha, Toyota-shi, Aichi-ken, Japan

[22] Filed: Dec. 5, 1972

[21] Appl. No.: 312,322

[30] Foreign Application Priority Data
Apr. 14, 1972    Japan................................ 47-37595

[52] U.S. Cl............. 137/575, 137/587, 220/85 VR, 280/5 A
[51] Int. Cl............................................... B65d 25/20
[58] Field of Search........... 137/587, 588, 351, 575, 137/43; 220/44 R, 44 A, 85 VR; 280/5 R, 5 A, 5 H; 123/136

[56] References Cited
UNITED STATES PATENTS

| | | | |
|---|---|---|---|
| 3,687,335 | 8/1972 | Hunter | 220/85 VR |
| 3,695,243 | 10/1972 | Torazza | 220/85 VR X |
| 3,614,960 | 10/1971 | Pfrengle | 220/44 A |
| 2,404,765 | 7/1946 | Valentyne | 280/5 A |
| 3,396,748 | 8/1968 | Hatakeyama et al. | 137/587 |
| 3,606,908 | 9/1971 | Riester | 137/587 X |
| 3,643,690 | 9/1970 | Sarai | 220/44 R X |

*Primary Examiner*—William R. Cline
*Attorney, Agent, or Firm*—Stevens, Davis, Miller & Mosher

[57] ABSTRACT

A device for preventing leakage of fuel oil overflowing from a fuel tank on a motor-vehicle upon a jolt or inclination of the vehicle, while maintaining the necessary communication of air between the interior and the exterior of the fuel tank, even when the fuel tank is full of fuel oil. This feature is obtained by forming at least a pair of openings in the top wall of the fuel tank, and extending a passage between those openings to recirculate the overflowing portion of fuel oil from one side of the fuel tank into the other side or to hold such fuel oil temporarily for subsequent recirculation into the fuel tank. The uppermost portion of the device has an open end to maintain the necessary communication of air between the interior and the exterior of the fuel tank, and this open end of the device is positioned at such a height above the fuel tank that no overflow of fuel oil usually takes place even if the vehicle has been heavily jolted or inclined.

8 Claims, 7 Drawing Figures

FUEL LEAKAGE PREVENTION DEVICE FOR A MOTOR-VEHICLE

This invention relates to a fuel leakage prevention device for a motor-vehicle fuel tank, and more particularly, to a device which provides means of temporary escape for the fuel oil overflowing from the fuel tank upon jolting or inclination of the vehicle to thereby avoid any leakage of fuel oil, while maintaining an adequate cmmunication of air between the interior and the exterior of the fuel tank.

Heretofore, a number of vent holes have been formed in the filler cap of a fuel tank on a motor-vehicle, or a vent pipe has been extended upwardly from the top of the fuel tank, in order to maintain a suitable communication of air between the interior and the exterior of the fuel tank. However, the former arrangement has been unsatisfactory because the fuel oil leaks out through the vent holes in the filler cap upon jolting or inclination of the vehicle with its fuel tank full of fuel oil. On the other hand, the major disadvantage of the latter arrangement has been a high degree of possibility of fuel oil leaking out through the vent pipe, though usually not in a large quantity, because of collision of a fuel oil portion tending to move up in the pipe with another fuel oil portion tending to move down when the vehicle has jolted.

It is, therefore, an object of this invention to provide a device for preventing leakage of fuel oil overflowing from a fuel tank on a motor-vehicle upon jolting or inclination of the vehicle, while maintaining the necessary communication of air between the interior and the exterior of the fuel tank, even when the fuel tank is full of fuel oil.

It is another object of this invention to provide such a fuel leakage prevention device including means for temporarily holding a portion of the overflowing fuel oil to smoothly guide recirculation thereof from one side of the fuel tank into the other side thereof.

It is still another object of this invention to provide such a fuel leakage prevention device including vent means for maintaining an adequate communication of air between the interior and the exterior of the fuel tank.

It is a further object of this invention to provide such a fuel leakage prevention device which also serves as an expansion chamber for the fuel oil tending to expand in volume due to temperature elevation thereof and to flow out of the fuel tank.

According to this invention, at least two openings are formed in the top wall of a fuel tank in a suitably spaced relationship. Each of these openings receives therein one end of a conduit extending above the fuel tank, and connected into the opening by a grommet or other appropriate means in an oiltight sealed manner. The other ends of the conduits are connected in an oiltight sealed manner to the opposite ends of a connector disposed above the tank approximately in the center thereof, and having a tubular portion formed therethrough. A hollow chamber having a substantially volumetric capacity is positioned on the connector, and integrally constructed therewith. This hollow chamber is provided at the boottom with a small hole which connects the chamber and the tubular portion of the connector. The hollow chamber also communicates with the exterior of the device through another small hole formed in the top and a vent tube connected to the outlet of the small hole. Thus, a proper communication of air is maintained between the interior and the exterior of the fuel tank through a passage defined by the openings in the top of the tank, the conduits, the connector, the hollow chamber, and the vent tube.

The device according to this invention, which is essentially constructed as generally described above, provides the following principal features and advantages:

When the motor-vehicle is caused to start, stop or turn suddenly, or is running on a sloping road, fuel oil tends to flow out from the fuel tank through the opening provided on one side of the tank where the level of the fuel oil becomes relatively high. The fuel oil flows through the device, and eventually returns into the tank usually through the other opening on the other side of the tank where the level of the oil is temporarily relatively low, so that no leakage of fuel oil takes place.

If the vehicle jolts so heavily that a larger quantity of fuel oil than can flow through the device at a time has overflown from the fuel tank, a part of the fuel oil enters the hollow chamber from the tubular portion of the connector through the small hole formed through the bottom of the chamber, while the remaining part of the oil directly flows back into the tank. It should be noted in this connection that since the hole provided to let a part of the fuel oil escape into the hollow chamber is formed with a considerably small diameter, it takes the fuel oil a considerably long time to fill the hollow chamber, and that since even a very heavy jolt of the vehicle would usually cease fairly long before the hollow chamber is filled with fuel oil, no fuel oil would leak out from the hollow chamber and hence from the fuel tank.

Moreover, the device according to this invention provides a satisfactory means of escape for the fuel oil tending to expand in volume with an increase in the ambient temperature and to flow out of the fuel tank. In this connection, the hollow chamber is especially useful for this purpose.

Furthermore, the device functions exactly as described above, so that no fuel oil leakage occurs, when the motor-vehicle is running along a sloping road in an inclined position.

The invention will now be described in further detail with reference to the accompanying drawings, in which.

Figure 1:
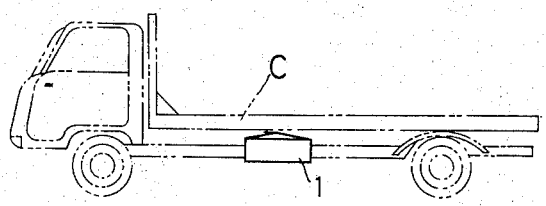
FIG. 1 is a schematic side view of a motor-vehicle mounting a fuel tank on its chassis.
Figure 2:
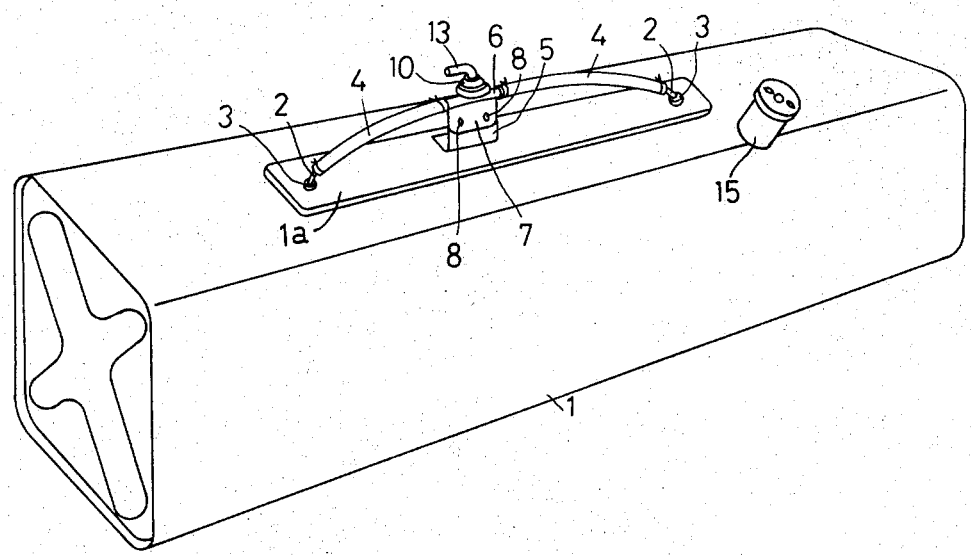
FIG. 2 is a perspective view of the fuel tank which is equipped with a device according to this invention.
Figure 3:
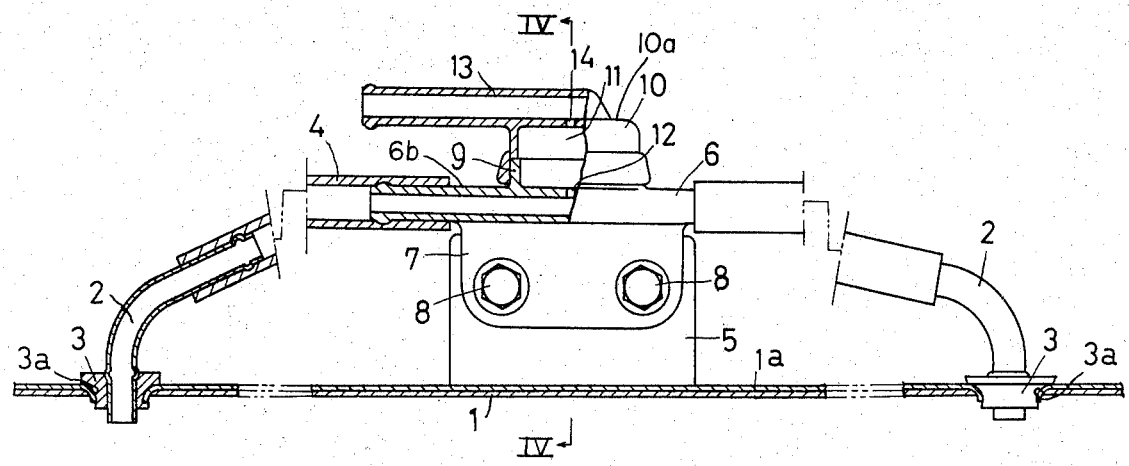
FIG. 3 is a font elevational view, partly in section, of the device shown in FIG. 2.
Figure 4:
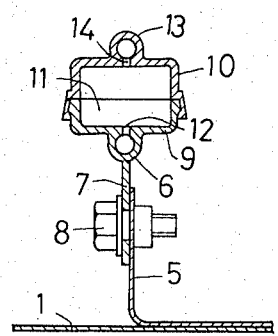
FIG. 4 is a vertical cross-sectional view taken along the line TV—IV of FIG. 3.
Figure 5:
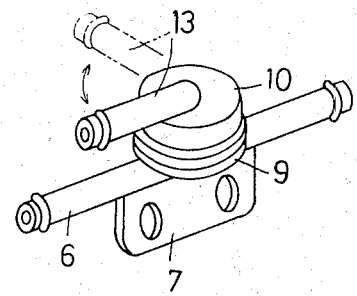
FIG. 5 is a perspective view showing in detail a part of the device shown in FIG. 2.

Referring now to FIGS. 1 through 5 more particularly, a preferred embodiment of this invention will be described. As shown in FIG. 1, a fuel tank 1 is mounted on the chassis C of a motor-vehicle. A mounting plate 1a is secured to the top wall of the fuel tank 1. Two openings 3a are formed through the mounting plate 1a and the top wall of the tank 1 in a suitably spaced relationship along the longitudinal axis of the tank 1. A grummet 3 is fitted in each of the openings 3a in an oiltight sealed manner as best shown in FIG. 3. A relatively short curved uptake 2 is connected into each grummet 3 in an oiltight manner at one end opening into the tank 1, and the other or upper ends of the uptakes 2 face each other toward the center of the tank 1. Extended from the oppositely faced upper ends of the uptakes 2 along the longitudinal axis of the tank 1 are a pair of relatively elongate conduits 4 connected over the upper ends of the uptakes 2 in an oiltight sealed manner. The opposite ends of the conduits face each other approximately in a position above the center of the tank 1. A support plate 5 having a substantially L-shaped vertical cross section is joined to the mounting plate 1 a by welding at a low temperature or otherwise in the area defined between the oppositely faced ends of the conduits 4. A connector 6 comprising an upper tubular portion defining a connecting passage 6b and a lower flat web portion 7 depending from the bottom edge of the upper tubular portion 6b is joined to the upright portion of the support plate 5 by bolts 8 and nuts.

The tubular portion 6b of the connector 6 is somewhat projected at both ends from the side edges of the web portion 7, and connected in an oiltight sealed manner into the oppositely faced ends of the conduits 4 to thereby define an in-line fuel overflow passage extending between the openings 3a of the tank 1 in combination with the conduits 4 and the uptakes 2. A short, substantially cylindrical or cup-shaped casing 9 generally closed at the bottom thereof is positioned on the top of the connector 6, and constructed integrally with the latter. A short, substantially cylindrical cover 10 which is generally closed at the top 10a thereof, and shaped like an inverted cup is rotatably placed on the casing 9. The lower edge of the cover 10 is spread outwardly to a certain extent, surrounds the upper edge of the casing 9, and is slidable along the upper edge of the casing 9, while maintaining an oiltight fit of the cover 10 with the casing 9. The casing 9 and the cover 10 placed thereover define a hollow chamber 11 having a relatively large volumetric capacity. The casing 9 is formed with a small hole 12 in the center of the bottom thereof, and the hole 12 defines a restricted passage for communication between the connector passage 6b and the hollow chamber 11. A vent tube 13 is integrally connected to the top 10a of the cover 10 at one end, extends substantially in parallel to the connecting passage 6b, and is open at the other end thereof. The cover 10 is formed with a small hole 14 in the top 10a thereof, and the hole 14 defines a restricted passage for communication between the hollow chamber 11 and the exterior of the device through the vent tube 13. Thus, the interior of the fuel tank 1 is maintained in adequate communication with the open air in the exterior of the tank through the uptakes 2, the conduits 4, the connector 6, the hole 12, the hollow chamber 11, the hole 14, and the vent tube 13.

The direction in which the outer or open end of the vent tube 13 is faced may be suitably changed by turning the upper half 10 of the hollow chamber 11 relative to the lower half 9 thereof, but if no necessity for such change of direction is anticipated, the hollow chamber 11 may be formed as a single generally closed casing provided with a narrow passage 12 at the bottom, and another narrow passage 14 at the top. A filler cap is shown at 15 in FIG. 2.

The operation of the device according to the embodiment as hereinabove described will now be described. When the vehicle is caused to start suddenly, for instance, the level of the fuel oil in the tank 1 has a natural tendency to incline upwardly toward the rear end of the vehicle. If such inclination of the fuel level is sufficiently large, a portion of the fuel oil is caused to flow out from the rear end portion of the tank 1, and eventually flow back into the front end portion thereof, through the uptake 2 located closer to the rear end of the tank 1, the conduit 4 adjoining thereto, the connector passage 6b, the conduit 4 extending from the opposite end of the passage 6b, and the uptake 2 closer to the front end of the tank 1. If a larger amount of fuel oil than can flow at a time through the in-line flow passage of the immediately preceding sentence has overflown from the tank 1, a part of the fuel oil enters the hollow chamber 11 through the hole 12 provided at the bottom thereof. But since the hole 12 has a considerably small diameter, and the hollow chamber 11 is on the other hand designed with a substantially large volumetric capacity, the amount of the fuel oil flowing into the hollow chamber 11 is restricted to such an extent that the fuel oil usually never fills the chamber 11 to thereby leak out through the upper hole 14 and the vent tube 13. When the inclination of the fuel level in the tank 1 is relatively small, the fuel oil overflowing from the tank 1 does not even reach the intermediate connector 6, but flows back into the same end of the tank 1 as soon as the vehicle ceases to jolt. Because the hollow chamber 11 is located at a considerable height above the fuel tank 1, the fuel oil would usually never flow into the hollow chamber 11 even when the vehicle is running on a sloping road, though a part of the fuel oil may reach the connector 6.

Figure 6:
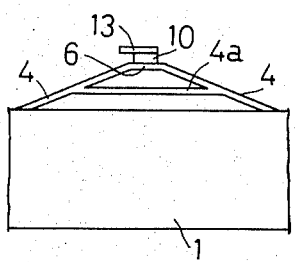
FIG. 6 is a schematic front elevational view of a portion of another embodiment of this invention.

FIG. 6 shows another embodiment of this invention. According to this particular embodiment, there is provided a bypass 4a connecting the two conduits 4 in a position below the intermediate connector 6. A portion of the fuel oil rising through one of the conduits 4 is directly led through the by-pass 4a into the other conduit 4 without flowing through the connector 6, and flows more quickly back into the tank 1.

Figure 7:
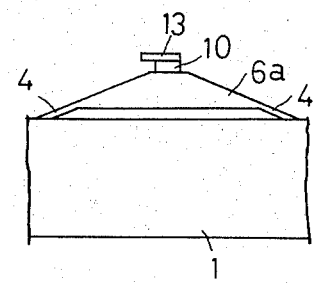
FIG. 7 is a view similar to FIG. 6, showing a portion of still another embodiment of the invention.

Still another embodiment of this invention will be described with reference to FIG. 7. According to this embodiment, there is provided an enlarged chamber 6a to replace the intermediate connector passage 6b as hereinbefore described, and to accommodate the fuel oil overflowing from the tank 1 upon expansion in volume due to its temperature elevation, or upon a jolt of the vehicle. In the event any of such conditions develops, the fuel oil overflows into the enlarged chamber 6a through one of the conduits 4. If the amount of the fuel oil overflowing from the tank 1 is greater than the chamber 6a can accommodate, the fuel oil then enters the hollow chamber 11 through the hole 12 provided at the top of the chamber 6a.

It will be understood that an in-line overflow passage comprising, in combination, the uptakes 2, the conduits 4 and the intermediate connector passage 6b (FIGS. 1 through 6) may be replaced by a single upwardly curved conduit connected in an oiltight manner at both ends into the openings 3a of the fuel tank 1, and communicated with the hollow chamber 11 disposed on the highest portion thereof through a small passage similar to the hole 12.

It will further be noted that while the invention has been described as having a pair of openings formed in the top wall of a fuel tank to define the two extremities of an in-line overflow passage, it would be more convenient to form a total of four openings, one adjacent to each corner of the tank, when the tank is square in plan, and provide two in-line overflow passages crossing each other at an intermediate connector.

While the invention has been described and shown in several modified forms, it will be understood that other modifications or alterations may be easily made by those skilled in the art without departing from the scope of the invention, which is only defined by the appended claims.

What is claimed is:

1. A fuel leakage prevention device for a motor-vehicle fuel tank, comprising:
    a pair of openings formed in the top of said fuel tank in a suitably spaced relationship;
    fuel overflow passage means disposed above said fuel tank and comprising two separate parts each having an upper end and a lower end connected in an oiltight manner into one of said openings, said upper ends facing each other; and
    a hollow chamber constructed integrally with a connector thereunder, said connector having a tubular portion defining a connecting passage connecting said upper ends of said two separate parts, said hollow chamber having a small hole formed through the top wall thereof to communicate the interior of said hollow chamber with the exterior of the device and another small hole formed through the bottom wall thereof to communicate said connecting passage and said hollow chamber, whereby a passage for air is established between the interior and the exterior of said fuel tank through the device.

2. The device as defined in claim 1, wherein said hollow chamber is formed of a single generally closed structure.

3. The device as defined in claim 2, further including a vent tube having an open free end, and connected at the other end to the top of said hollow chamber.

4. The device as defined in claim 1, further including a by-pass for fuel connecting two oppositely faced points of said fuel overflow passage means, and extending below said hollow chamber.

5. The device as defined in claim 1 wherein each of said two separate parts comprises:
    an uptake having the lower end connected in an oiltight manner into one of said openings; and
    a conduit having a lower end connected in an oiltight manner with the upper end of said uptake and an upper end connected in an oiltight manner with one end of said connecting passage.

6. The device as defined in claim 1 wherein said connector further includes a flat web portion depending from the bottom edge of said tubular portion and adapted for connection with a supporting plate extending upwardly from the upper surface of said fuel tank.

7. The device as defined in claim 1 wherein said hollow chamber comprises:
    a lower half integrally constructed with said connecting passage in a mutually communicative relationship: and
    an upper half rotatably positioned on said lower half.

8. The device as defined in claim 7 further including a vent tube having an open free end, the opposite end of said tube being connected to the top wall of said upper half of said hollow chamber, whereby communication between the interior and the exterior of said hollow chamber is provided through said small hole on the top wall of said hollow chamber.

* * * * *

UNITED STATES PATENT OFFICE
CERTIFICATE OF CORRECTION

Patent No. 3,805,829            Dated April 23, 1974

Inventor(s) Takeshi Yamamoto and Masami Yamamoto

It is certified that error appears in the above-identified patent and that said Letters Patent are hereby corrected as shown below:

IN THE HEADING:

Please correct the assignee's name to read -- Toyoto Jidosha Kogyo Kabushiki Kaisha --

IN THE SPECIFICATION:

Page 2, Column 1, line 10, change "cmmunication" to read -- communication --;
, line 63, change "boottom" to read -- bottom --.
, Column 2, line 51, change "font" to read -- front --;
, line 54, change "TV-IV" to read -- IV-IV --.

Signed and sealed this 24th day of September 1974.

(SEAL)
Attest:

McCOY M. GIBSON JR.
Attesting Officer

C. MARSHALL DANN
Commissioner of Patents